United States Patent [19]
Shepherd et al.

[11] Patent Number: 4,789,098
[45] Date of Patent: Dec. 6, 1988

[54] SYSTEM FOR HEATING VEHICULAR OPERATOR SPACE AND ENGINE FUEL, AND FOR SEPARATING MOISTURE THEREFROM

[76] Inventors: David W. Shepherd; Michelle L. Shepherd, both of 27500 Highway 101, Rockaway, Oreg. 97136

[21] Appl. No.: 18,991

[22] Filed: Feb. 25, 1987

[51] Int. Cl.⁴ .............................................. B60H 1/02
[52] U.S. Cl. ........................... 237/12.3 R; 237/12.3 B; 123/548; 123/557; 123/142.5 R
[58] Field of Search ............... 123/557, 142.5 R, 548; 237/12.3 R, 12.3 B, 12.3 C, 12.3 A

[56] References Cited
U.S. PATENT DOCUMENTS
4,146,002  3/1979  Quinn .................................. 123/557
4,553,697  11/1985  Nothen et al. ........................ 123/557

*Primary Examiner*—Henry Bennett
*Attorney, Agent, or Firm*—Jack E. Day

[57] ABSTRACT

An apparatus for separating out absorbed and entrained moisture from fuel used in a motor vehicle or heating system. A baffle plate exposed to infrared radiation forms the primary functional moisture separating device.

16 Claims, 1 Drawing Sheet

SYSTEM FOR HEATING VEHICULAR OPERATOR SPACE AND ENGINE FUEL, AND FOR SEPARATING MOISTURE THEREFROM

This invention relates to heating and fuel systems intended for use primarily, but not limited thereto, on motor vehicles operating in extremely cold environments, where use and conservation of heat energy is of critical importance for heating the vehicle operator's space thereof as well as the engine fuel therefor, and separating out moisture absorbed and entrained therein, prior to use.

BACKGROUND OF THE INVENTION

The operation of internal combustion engines in frigid environments brings many problems resulting from the low temperatures, among which are:
- providing a safe and comfortable working environment for the engine operator;
- separating moisture from the motor fuel;
- obtaining an optimum mixture of fuel and air before inducting said mixture into the engine; and
- preventing heat loss during the foregoing operations.

A safe and comfortable working environment for vehicle operators, even in frigid environments, is not normally associated with the heating of fuels and fuel-/air mixtures, or the demoisturizing of fuels. However, since heat is a common factor in each function, they are considered as relevant and interrelated aspects of the same problem in the present invention.

Separating moisture from fuel is important in frigid conditions. Several problems become critical, especially for engines used in motor vehicles:
- water absorbed or entrained in fuel can freeze, endangering the integrity of enclosures and lines;
- evaporation of either liquid reduces the temperature of the mixture, increasing the danger of icing;
- the space for accomodating insulation or for housing separator equipment is relatively limited;
- the problem of maintenance and repair is very great, since the environment of use is severe, in terms of vibration, extremes of temperature, etc.;
- the users/operators, of vehicles especially, are often mechanically and technically unsophisticated, requiring the equipment thereof to be troublefree and easy to maintain; and
- the proportion of overall equipment weight and cost to be allocated to heating and separator functions is usually small, since they do not represent major, or even subsidiary, engine or vehicle objectives.

It is well known that heating fuel and fuel/air mixtures for use in internal combustion engines becomes critical as the environmental temperature becomes colder, because the more volatile fuels, such as gasoline or even kerosene, have a substantial cooling effect as they vaporize, causing problems with vaporization and icing. Extremely cold weather intensifies these problems. Several devices have been developed to heat fuel-/air mixtures for such engines, but these ignore the fact that fuel, if it is heated, vaporizes more easily and mixes with air more efficiently. Diesel fuel, on the other hand, often needs to be heated to enable it to vaporize and mix properly with air to obtain an optimally combustible mixture. Especially is this true in extremely cold climates.

Thus, solutions to these problems for engines using more volatile fuels often are not satisfactory for diesel engines.

The heating of the operator's space, the heating of fuel, and the separation of moisture absorbed and entrained therein, traditionally have been dealt with as separate problems, and the following prior art survey will follow that pattern, although the present invention solves them as part of the same problem.

Space heaters for motor vehicles are familiar to everyone, and little needs to be said about those that use radiator coolant as the heat source.

Fuel heaters for diesel fuel are used widely. Baker U.S. Pat. No. 4,372,260 discloses an engine heater attachment for heating the fuel of an engine before introducing it into the combustion chambers. This obtains better vaporization of the fuel, with subsequent easier ignition of the fuel/air mixtuure, and reduces any tendency of the fuel lines and small openings in the fuel system to clog with ice or congealed fuel components which are often encountered in some of the extremely cold climates in which engines are required to operate.

Heaters for fuel/air mixtures are common in the prior art. However, in frigid environments, these are less than satisfactory, as:
- fuel vaporizes more easily if heated;
- warmed vaporized fuel mixes more thoroughly with air, thus more easily achieving an optimum fuel/air mixture.

Gagnon U.S. Pat. No. 4,399,794 discloses a carburetion system for an internal combustion engine which seeks to combine more complete vaporization of a fuel-/air mixture with heating thereof. Drops of fuel are dropped onto a rotating fan, breaking them into smaller droplets, aiding in their vaporization, and helping to achieve a more complete fuel/air mixture thereby. Before this mixture goes into the manifold for distribution to the cylinders, it is drawn through a heater for heating and better vaporization and mixing. Other than disclosing a combination of the two functions, there is little relationship to the present invention, than which it is substantially less efficient.

Baker is substantially more efficient than the Gagnon disclosure, as heating fuel before vaporization makes it easier to vaporize and obtain an optimum mixture with air.

The problem of separating water from fuel is one aspect of the problem of separating one liquid from another, and it is intensified in frigid conditions. This has been the subject of a number of patents, of which Kay U.S. Pat. No. 3,362,534 is the most pertinent.

Kay discloses an improved apparatus for separating entrained moisture from liquid fuels, wherein the fuel is passed, in laminar flow, over a roughened baffle plate. The roughened surface serves to trap droplets of moisture by surface tension, and they are drawn away by gravity against the flow of the fuel. According to the disclosure, the surface roughness must be within the limits of 100–180 RMS (millionths of an inch) for greatest efficiency.

According to Kay, this improvement is substantially more efficient in separating moisture from fuel than previous methods.

Both Kay and Baker disclose features which are incorporated into the present invention but which, separately or together, do not anticipate or even suggest the present invention.

BRIEF DESCRIPTION OF THE PRESENT INVENTION

The present invention is a novel system for:
heating an engine operator enclosure (i.e., a cab);
heating fuel for the engine;
maintaining a desirable level of heat for each purpose under varying demands;
separating entrained moisture from fuel; and
reducing heat loss to the minimum during each of the foregoing operations. The system is especially effective in extremely cold climates, where operator comfort has sometimes been slighted for engine operating efficiency, and where moisture-containing fuels can cause several different and undesirable problems.

In the present invention, four novel features, separately and in combination, operate to obtain the unexpected results disclosed herein:

1. processes for heating the operator space and for heating the engine fuel are inter-related in a novel way, with the first overriding the second in certain extreme conditions;
2. a surface treatment of the fuel heater/moisture separator cannister for improving the heating of the fuel significantly conserves heat energy for the operator enclosure;
3. the "roughened or scabrous surface" of Kay, which is therein claimed to effect a significant improvement in the separation of absorbed and entrained moisture from fuel, is exploited in a novel way to obtain unexpected improvements in:
   a. heating said fuel; and
   b. further increasing the efficiency of moisture separation therefrom; and
4. a further novel treatment of the physical form of separator baffle plates further increases the efficiency of heating the fuel;

as will hereinafter be explained in greater detail.

For the heating processes, heated fluid, which is engine coolant in most instances, is used for fuel heating before vaporization, as disclosed in Baker, and space heating, as is well-known in the art. However, the loss of heat energy from the heating fluid during fuel heating is unexpectedly minimized by a novel treatment of the fuel heating cannister, so as to conserve said heat energy for space heating, and the flow of heating fluid required to keep the operator enclosure at a desired temperature is automatically maintained during operation, even at the expense of engine efficiency (but not operation), to protect operator welfare and safety when necessary.

At the same time as the fuel is being heated, partially by means disclosed by Baker, and partially by an unexpected result of means disclosed by Kay, unwanted absorbed and entrained moisture therein is separated therefrom by said means of Kay. The roughened surface thereof is used in a way not contemplated or suggested therein, to increase the efficiency of both fuel heating and moisture separation, beyond what is suggested or contemplated either by Kay or Baker or any combination of them. Further energy is saved by a novel surface treatment of the exterior surface of the fuel heater/moisture separator cannister.

The present invention exploits the roughened surface of Kay by altering the degree of roughness specified therein to selectively absorb infrared radiation from the heating fluid - engine coolant - at substantially the range of temperatures encountered under normal operating conditions, that is, at 120°-200° F. or higher. Consequently, the effective heating surface of the fuel heater is significantly increased over that of Baker with no increase in physical size thereof for a given volume of fuel processed therethrough. At the same time, the moisture separating efficiency of Kay is unexpectedly and significantly increased by this novel heating of the separator baffle plates.

Fuel containing absorbed and entrained moisture is passed, in a laminar flow, over a specially shaped separator baffle plate having a roughened surface thereon, somewhat similar to the roughened surface of Kay, but with the degree of roughness being selected to enhance the absorption of infrared radiation from the heating fluid. In addition, the baffle plates have formed therein parabolically-shaped depressions which provide additional heating of the fuel.

The present invention is distinguished from Kay, Baker or a combination of them, in several novel ways:

1. the system of the present invention circulates heating fluid (normally coolant from the engine) and directs it through a flow diverter, which directs a thermostatically controlled adjustable proportion of the heating fluid through the cab heater as needed to maintain a safe and comfortable working environment for the operator, and the balance is diverted through the fuel heater/separator, where it warms the fuel;
2. the fuel heater/separator of the present invention includes:
   a. a baffle plate which has:
      I. a multiplicity of depressions formed therein to increase the surface area and heating capability thereof;
      II. a surface finish roughness thereon in which the degree of roughness is substantially one-fourth wave-length of the infra-red radiation at the temperature of the heating fluid;
      III. is inclined to the sidewall of the cannister at an angle between 0°;
   b. the bottom portion of the cannister is formed of an inner and outer shell, forming a closed space therebetween for heating fluid to circulate therethrough, heating the inner shell and consequently the fuel in contact therewith; and
   c. the angle between said inner and outer shells of said cannister is limited to an angle between 0°;
   d. the outer surface of said cannister is polished to reduce heat loss therefrom.

Therefore, it is a principal object of the present invention to provide:

1. a system for both space heating and fuel heating, using heated engine coolant therefor, automatically apportioning said coolant to each use in accordance with predetermined requirements therefor;
2. a combination fuel separator and heater of increased efficiency and simplicity, providing:
   a. increased separation of moisture from said fuel;
   b. increased heating of said fuel; and
   c. reduced heat loss in the foregoing operations.

It is a further object of the present invention to provide a system which automatically apportions heated fluid to a space heater and a fuel heater, while meeting required minimum levels of heat for each use under frigid conditions.

It is an additional object of the present invention to provide a combined fuel heater and moisture separator which provides increased efficiency of both functions.

It is yet a further object of the present invention to provide a separator of increased efficiency for separating moisture absorbed and entrained in fuel.

It is a still further object of the present invention to provide a fuel heater of increased efficiency and effectiveness.

Another object of the present invention is to reduce heat loss in frigid environments while providing the foregoing benefits.

Other objects will become apparent as the present invention is described in connection with the drawings provided herewith.

DETAILED DESCRIPTION OF THE INVENTION

Figure 1:
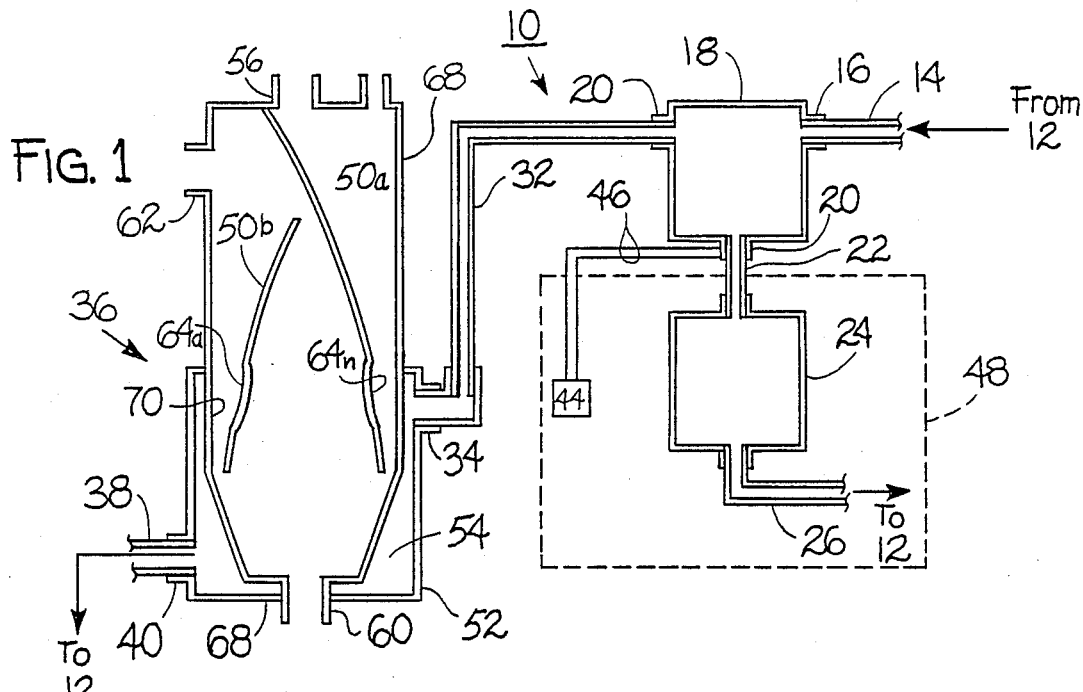
FIG. 1 is a block diagram of the various components of the novel system of the present invention, with fluid interconnections and flow disclosed therein.

Turning now to FIG. 1, we see a function and fluid flow schematic of the novel heating and moisture separation system 10 of the present invention.

Source 12 of heating fluid (which, for convenience of description will be considered the engine coolant system, although it need not be) is connected by fluid connection 14 to inlet port 16 of flow diverter 18. First outlet port 20 of flow diverter 18 has first fluid connection 22 to space heater 24, which is connected by first fluid return 26 to source 12.

Figure 2:
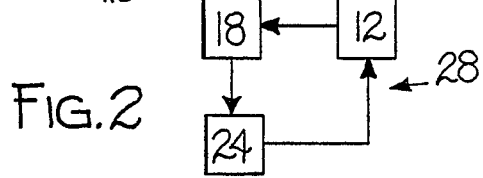
FIG. 2 is a block diagram of a first fluid flow loop in the invention.

Thus, there is a first fluid flow loop 28 from source 12 to flow deverter 18 to space heater 24 and return to source 12, as disclosed in FIG. 2.

Second outlet port 30 of flow diverter 18 has second fluid connection 32 to heating fluid inlet port 34 of novel fuel heater/moisture separator 36 (hereinafter heater/separator 36), which is connected by second fluid return 38 from second outlet port 40 to source 12. The structure of heater/separator 36 is explained in greater detail hereinafter in connection with FIG. 4.

Figure 3:
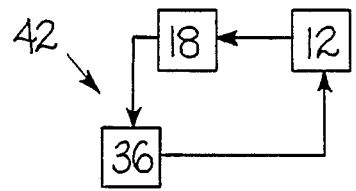
FIG. 3 is a block diagram of a second fluid flow loop in the invention.

Thus, there is a second fluid flow loop 42 from source 12 to flow diverter 18 to heater/separator 36 and return to source 12, as disclosed in FIG. 3.

It will be seen that both first fluid flow loop 28 and second fluid flow loop 42 include flow diverter 18 as a common element thereof.

Adjustable thermostatic control 44 is connected to first outlet port 20 by connection 46. Control 44 and space heater 24 will, in the preferred embodiment, be located in enclosure 48, which will normally be the operator's space, i.e., the cab of a vehicle.

Figure 4:
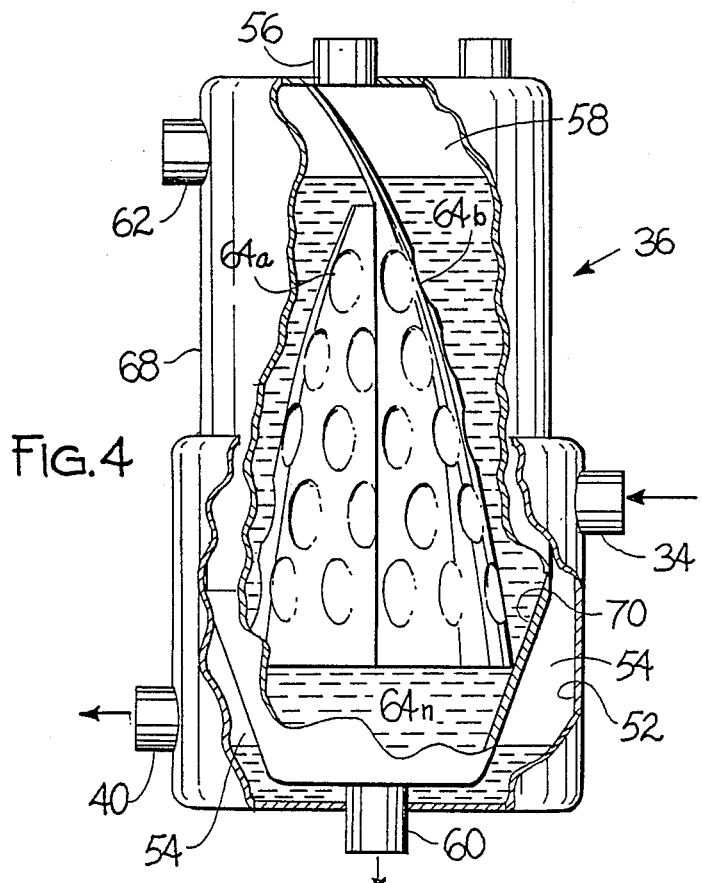
FIG. 4 is an enlarged cut-away sectional view of the structure of the novel fuel heater/moisture separator of the present invention, including the novel moisture separator baffle plates contained therein.

FIG. 4 discloses in greater detail the physical configuration and structure of heater/separator 36, including the novel baffle plates 50a and 50b of the present invention.

Heater jacket 52 surrounds the lower portion of the novel heater/separator 36, creating a space 54 through which heating fluid from source 12 flows. Second fluid connection 32 brings the heating fluid to inlet port 34, which opens into space 54, and second outlet port 40 conveys the heating fluid from space 54 via second fluid return 38 to source 12.

Third inlet port 56 brings into novel heater/separator 36 untreated fuel, which is induced into a laminar flow down the surface of novel baffle plates 50a and 50b. Space 58 inside heater/separator 36 is substantially filled with a fuel/moisture mixture, with moisture concentrated in the lower portion, and demoisturized fuel floating on top thereof, in the upper portion of the container. Moisture separated from the fuel is drawn off through third outlet port 60 at the bottom of heater/separator 36, and demoisturized fuel is drawn off through fourth outlet port 62 at the upper portion thereof. The separation process is described in detail hereinafter.

Separator baffle plates 50a and 50b have fabricated in the outer surface thereof a multiplicity of novel parabolically-shaped depressions (protruberances on the inner surface thereof) 64a, 64b . . . 64n, providing increased surface area for moisture separation thereon. Substantial portions of baffle plates 50a and 50b are located radiantly adjacent to, or surrounded by, that portion of heater/separator 36 which is encased by heater jacket 52. The entire outer surface 68 of heater/separator 36 is polished, with the unexpected result of reducing heat loss therefrom.

Figure 5:
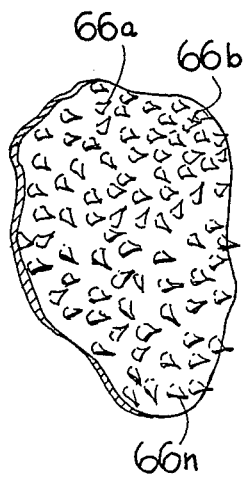
FIG. 5 is an enlarged view of the scabrous surface of the novel baffle plates of the present invention.

FIG. 5 discloses the detailed surface structure of baffles 50a and 50b of novel heater/separator 36 of the present invention. The surface thereof has a roughened or "scabrous" texture, that is, it is covered with a multitude of tiny points or projections 66a, 66b . . . 66n, the novel length of which is substantially equal to one-fourth wave-length of the infrared radiation emanating from the inner wall 70 of heater/separator 36. This radiation is due to the temperature difference between the wall 70 of heater separator 36, which has been warmed by the heating fluid, and the lower temperature of the fuel/moisture mixture and the baffles 50a and 50b.

120°–200° F. which is substantially the temperature range of the engine coolant, corresponds to a range in wavelength of 328 to 368 RMS (millionths of an inch). One-quarter wavelength will then be 82–92 RMS, and defines the degree of surface roughness required to accomplish the desired result. Any means of surface preparation which gives a "spiky" surface, such as sandblasting, may be used to obtain such a texture.

OPERATION OF THE PRESENT INVENTION

Thermostatic control 44 is set to obtain a desired degree of comfort in enclosure 48. Under normal circumstances, the requirements for heating fluid flow through space heater 24 to keep the temperature of enclosure 42 at the desired level will be only a small portion of the total capacity of heat source 12. That is, the quantity of heating fluid flowing in first fluid flow loop 28 is small relative to the capacity of heat source 12. Similarly, the capacity of heat source 12 is more than enough to supply sufficient heating fluid to heater/separator 36 so as to heat the demoisturized fuel for adequate vaporization to give efficient mixing with air before introducing the heated mixture into the combustion chambers.

However, there may be times when external conditions require more heat in the enclosure 48 for operator safety or welfare, and flow diverter 18, in response to the setting of control 44, will maintain whatever flow of heating fluid is necessary to meet that need, even to the point of reducing, from its optimal level, the heating provided by heater/separator 36 to the fuel passing therethrough. However, the diversion would not be so great as to endanger the freezing of the fuel lines or other fuel-handling components of the engine.

Kay '564 states that the surface roughness of the separator baffle should be "at least 100 RMS (microinches) and not over 180 RMS or the efficiency of separation drops off substantially" (Col. 3, lines 69–71, Kay). However, the present invention is based upon the discovery that:

increased temperature of separator baffle plates 50a and 50b results in signficantly increased efficiency of moisture separation;

altering the surface roughness of separator baffle plates 50a and 50b from that specified by Kay to substantially one-fourth wave-length of the infrared radiation from the heating fluid, significantly increases the temperature said baffle plates, thereby significantly increasing their efficiency of moisture separation;

forming into the outer surface of said baffle plates parabolically-shaped depressions 66a,66b . . . 66n further increases the efficiency of moisture separation; Possible explanations of these effects are:

this degree of surface roughness on the baffle plates acts selectively to absorb the heat of the engine coolant, thereby causing them to heat substantially beyond their normal temperature (which will be at the temperature of the incoming fuel). This would effectively increase the heating capability of the heater and obtain improved efficiency in vaporizing the fuel and its subsequent mixing with air.

the parabolically-shaped depressions in the baffle plates act to focus the heat emanating therefrom and create tiny "hot spots" in the fuel above the surface which act as additional heat sources.

Whatever the mechanisms, significantly improved fuel heating and moisture separation is obtained in extremely cold climates, where it is necessary to heat fuel to obtain more effective vaporization and mixing with air thereof to obtain more efficient combustion of the fuel/air mixture.

It has been found that altering the surface roughness from that specified by Kay to substantially one-fourth wave-length of the infrared radiation at the temperatures of the heating fluid, changes the character of the interface between the separated water and the demoisturized fuel from an approximately one-quarter inch layer of a turbid fluid to a sharply defined surface between two clear liquid, all other conditions being equal.

It has also been found that altering the exterior surface of heater/separator 36 from the normal finish, which is black, to a polished finish such as can be obtained with stainless steel, will alter the heat output of space heater 24 from inadequate for a comfortable level of heat in the enclosure 48, to an output which is more than satisfactory for the purpose.

It will be appreciated by those skilled in the art that the individual or combined demands of space heater 24 or heater/separator 36 will normally be small compared to the fluid capacity of source 12. Normally, the setting of control 44, and thus the quantity of heating fluid demanded by space heater 24 to satisfy that setting, would have little or no effect on the amount of heating fluid diverted to heater/separator 36. However, there may be times when the safety and physical well being of the operator is endangered because of external weather conditions, and the efficiency of engine operation then becomes of little importance. That is, if a choice must be made as to whether the temperature in the cab will be allowed to go so low that the operator's extremities will be in danger of frostbite, or the engine will run at peak efficiency, operator welfare takes precedence. On the other hand, if a choice must be made as to whether the engine will run at all or the operator will be merely uncomfortable, continued running must take precedence, as operator welfare and survival may ultimately depend upon the continued operation of the engine. Of course, there will be few times when such extreme choices will have to be made.

The terms and expressions which have been employed in the foregoing specification are used therein as terms of description and not of limitation, and there is no intention, in the use of such terms and expressions, of excluding equivalents of the features shown and described, or portions thereof, it being recognized that the scope of the invention is defined and limited only by the claims which follow.

We claim:

1. In a vehicular heating system having a source of infrared radiation including a heating fluid, the improvement comprising:
   a. said heating fluid flowing from and to said source:
      1. in a first fluid flow loop including:
         A. diverter means; and
         B. space heater means;
      2. in a second fluid flow loop including:
         A. said diverter means;
         B. fuel heater means; and
         C. moisture separator means;
   b. enclosure means including:
      1. said space heater means;
      2. thermostatic control means:
         A. adjustable to a desired temperature; and
         B. controllingly connected to said diverter means whereby said heating fluid is diverted from said fuel heater to said space heater to maintain said desired temperature in said enclosure means; and
   c. said fuel heater means has radiantly adjacent thereto:
      1. said moisture separator means, having a baffle plate therein;
         A. the surface of said baffle plate having thereon a roughness substantially corresponding to one-quarter wavelength of said infrared radiation.

2. The heater system of claim 1, wherein said baffle plate is surrounded by said fuel heater means.

3. In a means for separating moisture from fuel, the improvement comprising:
   a. fuel heater means having:
      1. therein a source of infrared radiation including a heating fluid flowing therethrough; and
      2. adjacent thereto a baffle plate having thereon a surface roughness substantially corresponding to one-quarter wavelength of said infrared radiation.

4. The means for separating moisture from fuel of claim 3, wherein said baffle plate is contained within the structure of said fuel heater means.

5. A heating system having a source of infrared radiation including a heated fluid, comprising:

a. means for space heating, located in an enclosed habitable space having therein an adjustable thermostatic control;
b. means for heating fuel;
c. means for separating moisture from said fuel;
d. flow diverter means having an inlet, a first outlet and a second outlet;
   1. said means for space heating having a first fluid connection from said first outlet;
   2. said means for heating fuel having a second fluid connection from said second outlet;
e. the proportion of said heated fluid flowing through said first outlet compared to said heated fluid flowing through second outlet being regulated by said adjustable control; and
f. said means for separating moisture being radiantly adjacent to said means for heating fuel.

6. A heating system having a source of infrared radiation including heated fluid, comprising:
a. means for space heating, located in an enclosed habitable space having therein an adjustable thermostatic control;
b. means for heating fuel;
c. means for separating moisture from said fuel;
d. flow diverter means having an inlet, a first outlet and a second outlet;
   1. said means for space heating having a first fluid connection from said first outlet;
   2. said means for heating fuel having a second fluid connection from said second outlet;
e. the proportion of said heated fluid flowing through said first outlet compared to said second outlet being regulated by said adjustable control; and
f. said means for separating moisture:
   1. having a baffle plate therein radiantly adjacent to said means for heating fuel; and
   2. said baffle plate having a surface roughness substantially corresponding to one-quarter wavelength of said infrared radiation.

7. The heating system of claim 5 or 6 wherein said flow diverter has:
a. said inlet having a first fluid connection to said source:
   2. said first outlet having a second fluid connection to means for space heating; and
   3. said second outlet having a third fluid connection to said means for heating fuel;
b. said adjustable thermostatic control being controllingly connected to said flow diverter means, whereby to maintain the flow of heating fluid to said means for space heating.

8. In a fuel heater having therein a source of infrared radiation, the improvement comprising:
a. means for separating moisture from fuel, having a baffle plate therein;
   1. said moisture separator being radiantly adjacent to said fuel heater; and
   2. the surface of said baffle plate having thereon a roughness substantially corresponding to one-quarter wavelength of said radiation.

9. The fuel heater of claim 8, wherein said baffle plate is contained within the structure of the fuel heater.

10. In a vehicle containing a source of infrared radiation including heating fluid, the improvement comprising:
a. means for heating fuel;
b. means for separating moisture from said fuel;
c. said fuel flowing in:
   1. first fluid flow loop including:
      A. flow diverter means: and
      B. space heater means;
   2. second fluid flow loop including:
      A. said flow diverter means; and
      B. said means for heating fuel;
d. enclosure means containing:
   1. said space heater means; and
   2. adjustable thermostatic control means;
e. said flow diverter means being connected to said adjustable control means, whereby to divert said heating fluid from said fuel heater means to said space heater means to maintain said temperature in said enclosure; and
f. said means for separating moisture from fuel being radiantly adjacent to said means for heating fuel.

11. The improvement in claim 10 wherein said means for separating moisture is a baffle plate with roughness thereon substantially corresponding to one-quarter wavelength of said infrared radiation.

12. The improvement in claim 1,3,6,8, or 11, wherein said infrared radiation exceeds the temperature of 120 degrees Fahrenheit.

13. The improvement in claim 1,3,6,8, or 11, wherein said infrared radiation is in the range of 120 to 200 degrees Fahrenheit.

14. In a means for separating moisture from fuel, the improvement comprising:
a. fuel heater means having:
   1. therein a source of infrared radiation including a heating fluid flowing therethrough; and
   2. adjacent thereto a baffle plate:
      A. having on the inner and outer surfaces thereof a surface roughness substantially corresponding to one-quarter wavelength of said infrared radiation; and
      B. having fabricated in the outer surface thereof a multiplicity of parabolicallyshaped depressions.

15. A heating system having a source of infrared radiation including heated fluid, comprising:
a. means for space heating, located in an enclosed habitable space having therein an adjustable thermostatic control;
b. means for heating fuel;
c. means for separating moisture from said fuel;
d. flow diverter means having an inlet, a first outlet and a second outlet;
   1. said means for space heating having a first fluid connection from said first outlet;
   2. said means for heating fuel having a second fluid connection from said second outlet;
e. the proportion of said heated fluid flowing through said first outlet compared to said second outlet being regulated by said adjustable control; and
f. said means for separating moisture:
   1. having a baffle plate therein radiantly adjacent to said means for heating fuel, said baffle plate having:
      A. a surface roughness thereon substantially corresponding to one-quarter wavelength of said infrared radiation; and
      B. having fabricated in the outer surface thereof a multiplicity of parabolicallyshaped depressions.

16. In a vehicle containing a source of infrared radiation including heating fluid, the improvement comprising:

a. means for heating fuel;
b. means for separating moisture from said fuel;
c. said fuel flowing in:
   1. first fluid flow loop including:
      A. flow diverter means; and
      B. space heater means;
   2. second fluid flow loop including:
      A. said flow diverter means; and
      B. said means for heating fuel;
d. enclosure means containing:
   1. said space heater means; and
   2. adjustable thermostatic control means;
e. said flow diverter means being connected to said adjustable control means, whereby to divert said heating fluid from said fuel heater means to said space heater means to maintain said temperature in said enclosure;
f. said means for separating moisture from fuel being radiantly adjacent to said means for heating fuel; and
g. said means for heating fuel being polished on the external surface thereof.

* * * * *